(12) United States Patent
Philipp et al.

(10) Patent No.: US 9,632,628 B2
(45) Date of Patent: Apr. 25, 2017

(54) INTERDIGITATED TOUCHSCREEN ELECTRODES

(75) Inventors: Harald Philipp, Hamble (GB); Esat Yilmaz, Chandler's Ford (GB)

(73) Assignee: Atmel Corporation, San Jose, CA (US)

(*) Notice: Subject to any disclaimer, the term of this patent is extended or adjusted under 35 U.S.C. 154(b) by 437 days.

(21) Appl. No.: 12/604,944

(22) Filed: Oct. 23, 2009

(65) Prior Publication Data

US 2011/0095990 A1 Apr. 28, 2011

(51) Int. Cl.
*G06F 3/044* (2006.01)

(52) U.S. Cl.
CPC .................... *G06F 3/044* (2013.01)

(58) Field of Classification Search
CPC ..................................... G06F 3/0488
USPC ......................................... 345/173
See application file for complete search history.

(56) References Cited

U.S. PATENT DOCUMENTS

| | | | |
|---|---|---|---|
| 6,222,528 B1 * | 4/2001 | Gerpheide et al. | 345/173 |
| 6,297,811 B1 * | 10/2001 | Kent | G06F 3/044 178/18.01 |
| 6,970,160 B2 * | 11/2005 | Mulligan et al. | 345/173 |
| 7,548,073 B2 * | 6/2009 | Mackey | G01D 5/2415 324/660 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,502,796 B1 * | 8/2013 | Yilmaz | G06F 3/044 178/18.06 |
| 2004/0119701 A1 | 6/2004 | Mulligan et al. | |
| 2007/0176608 A1 | 8/2007 | Mackey et al. | |
| 2009/0218310 A1 * | 9/2009 | Zu | B82Y 10/00 216/11 |
| 2009/0273573 A1 * | 11/2009 | Hotelling | G06F 3/0362 345/173 |

(Continued)

FOREIGN PATENT DOCUMENTS

| | | | | |
|---|---|---|---|---|
| CN | 1754141 A | | 3/2006 | |
| CN | 101833404 | * | 9/2010 | G06F 3/044 |

(Continued)

OTHER PUBLICATIONS

"2009—Conductive Inkjet Technology", [online]. [retrieved Apr. 20, 2010]. Retrieved from the Internet: <URL: http://www.conductiveinkjet.com/about-us/latest-news/2009.aspx>, 1 pg.

(Continued)

*Primary Examiner* — Claire X Pappas
*Assistant Examiner* — Robert Stone
(74) *Attorney, Agent, or Firm* — Baker Botts L.L.P.

(57) ABSTRACT

A device includes a plurality of adjacent electrodes for a touch sensitive device. The electrodes run generally in a first direction. Adjacent electrodes are interdigitated to provide one or more interpolation sections of the electrodes. Touch sensitive devices may utilize such interdigitated electrodes as drive electrodes, along with transverse sense electrodes formed over a display.

25 Claims, 13 Drawing Sheets

(56) References Cited

U.S. PATENT DOCUMENTS

| | | | |
|---|---|---|---|
| 2009/0273577 A1* | 11/2009 | Chen | G06F 3/044 345/174 |
| 2009/0315854 A1 | 12/2009 | Matsuo | |
| 2010/0026655 A1* | 2/2010 | Harley | 345/174 |
| 2010/0045614 A1* | 2/2010 | Gray | G06F 3/044 345/173 |
| 2010/0059294 A1* | 3/2010 | Elias | G06F 3/0416 178/18.06 |
| 2010/0065342 A1* | 3/2010 | Shaikh | 178/18.06 |
| 2011/0025639 A1* | 2/2011 | Trend | G06F 3/044 345/174 |
| 2012/0227259 A1* | 9/2012 | Badaye | G06F 3/044 29/846 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2013/0100038 A1* | 4/2013 | Yilmaz | G06F 3/044 345/173 |

FOREIGN PATENT DOCUMENTS

| | | |
|---|---|---|
| TW | 200807283 A | 2/2008 |
| WO | WO 2012/129247 | 9/2012 |

OTHER PUBLICATIONS

"Cambrios Technologies Corporation Awarded Department of Defense Contract for Flexivle Solar Cells", [online]. [retreived Apr. 20, 2010]. Retrieved from the Internet: <URL: <http://www.cambrios.com/200/DOD_Release.htm>, (Apr. 12, 2010), 2 pgs.

"New Silver Conductive Inks Target High-Growth Touch Screen and OLED Markets", [online]. [retrieved Apr. 20, 2010]. Retrieved from the Interent: <URL: http://www2.dupont.com/MCM/en_US/news_events/article20100413.html>, (Apr. 13, 2010), 3 pgs.

"Printing of Antennas and Flexible Circuits", *Core Applications & Technologies*, (c) 2009 Conductive Inkjet Technology Ltd., (Oct. 2009), 23 pgs.

Hörteis, M., et al., "Fine Line Printed and Plated Contacts on High OHMIC Emitters Enabling 20% Cell Efficiency", *2009 34th IEEE Photovoltaic Specialists Conference (PVSC)*, (2009), 000060-000065.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

First Office Action Issued by State Intellectual Property Office (China), regarding patent application 2010/10519970.4 (Chinese and English versions). Mar. 26, 2014.

Second Office Action Issued by State Intellectual Property Office (China), regarding patent application 2010/10519970.4; Ref 2014110600868430 (Chinese and English translation) Nov. 15, 2014.

Office Action Issued by State Intellectual Property Office (IPO) Taiwan, regarding patent application 099136189; (w/English translation), Apr. 17, 2015.

* cited by examiner

INTERDIGITATED TOUCHSCREEN ELECTRODES

BACKGROUND

Touchscreen displays are able to detect a touch such as by a finger or stylus within an active or display area. Use of a touchscreen as part of a display enables a user to interact with an electronic application by touching the touchscreen. The display may present images to the user. Such images may include user interface constructs such as different buttons, images, or other regions that can be selected, manipulated, or actuated by touch. Touchscreens can therefore provide an effective user interface for cell phones, GPS devices, personal digital assistants (PDAs), computers, ATM machines, appliances, and other devices.

Touchscreens use various technologies to sense touch from a finger or stylus, such as resistive, capacitive, infrared, and acoustic sensors. In capacitive sensor based touchscreens, a touch changes a capacitance at a node in an array of electrodes overlaying the display device. Capacitive touchscreens often use two separate layers of transverse electrodes arranged as an X-Y matrix separated by a dielectric layer. The regions proximate the intersections of the transverse electrodes form sensing nodes, which are individually accessed by a sequential scanning process to determine the location of one or more touches. Transparent electrodes made from indium tin oxide (ITO) or transparent conductive polymers, or fine metal lines may be used to form the array of nodes over a liquid crystal display (LCD). Images on the LCD display can be seen through the transparent capacitive touchscreens.

LCD displays may emit alternating electric fields that can interfere with touch detection. In some prior touchscreen devices, an additional solid ITO layer was used as a shield between the electrodes layers and the LCD. This added significant expense in materials as well as processing. In other prior touchscreen devices, a layer of electrodes closest to the LCD, referred to as drive electrodes, was made up of wide electrodes that substantially covered the LCD, providing a shield for a top layer of electrodes referred to as sense electrodes. Some prior devices utilized intermediate drive electrodes 150, 155 as shown in FIG. 1, along with a network of resistors 160 to couple the intermediate drive electrodes from the primary X drive signals as shown. The use of intermediate drive electrodes allowed a reduction in the number of X drive lines directly driven by the control circuitry, reducing the complexity and pin count of the control circuitry and the number of required connection wires. However, the resistors required space, increased cost, and also degraded manufacturing yield. It also created additional loading on the control circuitry, dissipated more power, and degraded the shielding capability of the electrodes against LCD noise due to raised effective impedance levels of the electrodes caused by the introduction of the divider resistors.

SUMMARY

A device includes a plurality of adjacent electrodes for a touch sensitive device. The electrodes run generally in one direction. Adjacent electrodes are interdigitated to provide one or more interpolated sections of the electrodes. Touch sensitive devices may utilize interdigitated drive electrodes along with transverse sense electrodes formed over a display.

DETAILED DESCRIPTION

Multiple embodiments are described. In a first embodiment, a plurality of adjacent drive electrodes for a touchscreen run generally in a first direction. Adjacent drive electrodes may have projections that extend towards each other. The projections may be interleaved or interdigitated to provide one or more interpolated sections of the drive electrodes where the projections are interdigitated. The drive electrodes may be solid fill conductive areas in one set of embodiments, and fine line drive electrodes in another set of embodiments. In further embodiments, sense electrodes may be interdigitated.

Figure 1:
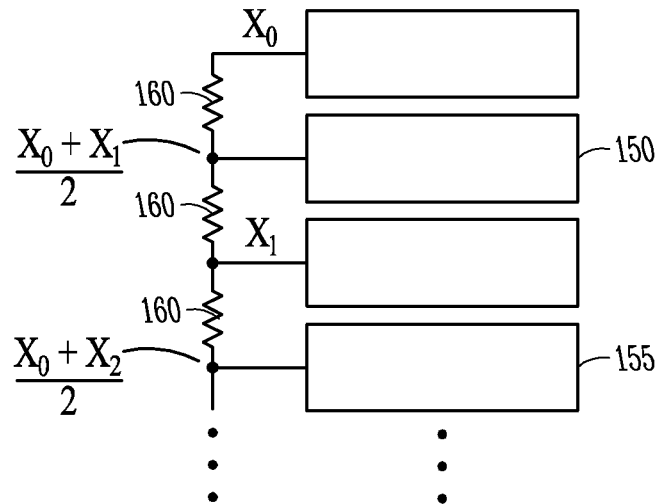
FIG. 1 illustrates a prior art drive electrode pattern.
Figure 2:
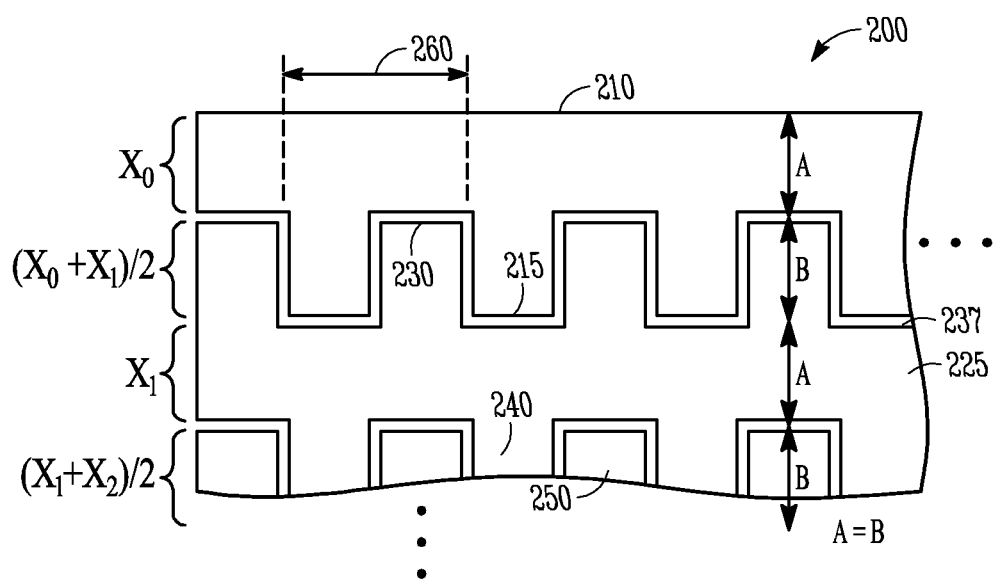
FIG. 2 illustrates an interdigitated drive electrode pattern with interpolation for a touchscreen according to an example embodiment.

FIG. 2 illustrates an interdigitated drive electrode pattern 200 with interpolation for a touchscreen according to an example embodiment. A drive electrode 210 runs longitudinally in a first direction. A first portion of the drive electrode 210 is continuous for a desired width (shown in bracket), and corresponds to an $X_0$ drive line coupled to drive circuitry (not shown). A second portion of the drive electrode 210 includes a plurality of projections or steps 215 (shown in bracket). The projections may be substantially the same width as the width of the first portion of the drive electrode 210, ie, distances shown as A and B may be the same in order to provide for equal spacing of the interpolative zones along the vertical axis of the pattern 200.

An electrode 225 is adjacent to drive electrode 210 and also has a continuous portion for a desired width, which may be the same width as the continuous portion of electrode 210. The continuous portion of electrode 225 corresponds to drive line $X_1$, shown in bracket, that may be coupled to drive circuitry. Second electrode 225 also contains steps or projections 230 that are interdigitated with projections 215 and are separated by a gap 237. Together, the interdigitated projections result in an interpolated drive section, which is driven by both drive lines $X_0$ and $X_1$, shown in bracket, which on average has 50% of its electric field driven by $X_0$ and 50% by $X_1$ Second electrode 225 in one embodiment includes further projections 240 on a second side for interdigitation with projections 250 from a further adjacent $X_2$ drive electrode.

The interdigitated sections shown in brackets between $X_0$ and $X_1$, and $X_1$ and $X_2$, designated as $(X_0+X_1)/2$ and $(X_1+X_2)/2$ respectively emit a mixture of fields driven by the respective drive lines with a granularity approximating width 260; if this width is smaller than the width of a finger print area on an overlaying panel, the response of the merged fields can represent a reasonably interpolated signal which can be used to locate a touch intermediate the continuous electrode strips. This effect is aided by the fact that an overlying dielectric panel (not shown) tends to mix or blend adjacent fields in boundary regions, thereby smoothing the transitional response to a finger. If the width 260 is too wide, and the overlying panel too thin, then it would be possible that the linearity of the touch panel would be adversely affected by localized distortions.

In one embodiment, there is a near one to one relationship between non-interpolated drive sections or simply drive sections and interpolated drive sections, with one interpolated drive section formed by the interdigitated steps or projections between adjacent drive sections. The drive and interpolated drive sections in one embodiment, may be made of filled areas of metal, conductive plastic, ITO or other form of conductive material. If the touchscreen is to be positioned over a display, the conductive material may be substantially transparent to allow visibility of the display beneath the touchscreen. When the electrodes are formed of filled areas of conductive material, they may act as an electric field shield between a display and sense electrodes.

In one embodiment, a 50/50 proportional mixture of adjacent X drive lines create an intermediate section to increase the X section count without adding additional drive lines. Given N, X lines directly driving N electrodes, the 50/50 proportional mixture provides an additional N−1 intermediate sections without increasing beyond N actual connections to drive circuitry. In one embodiment, resistors previously used to provide intermediate drive electrodes may be eliminated, resulting in an improved layout efficiency as well as a reduction in space requirements.

Figure 3:
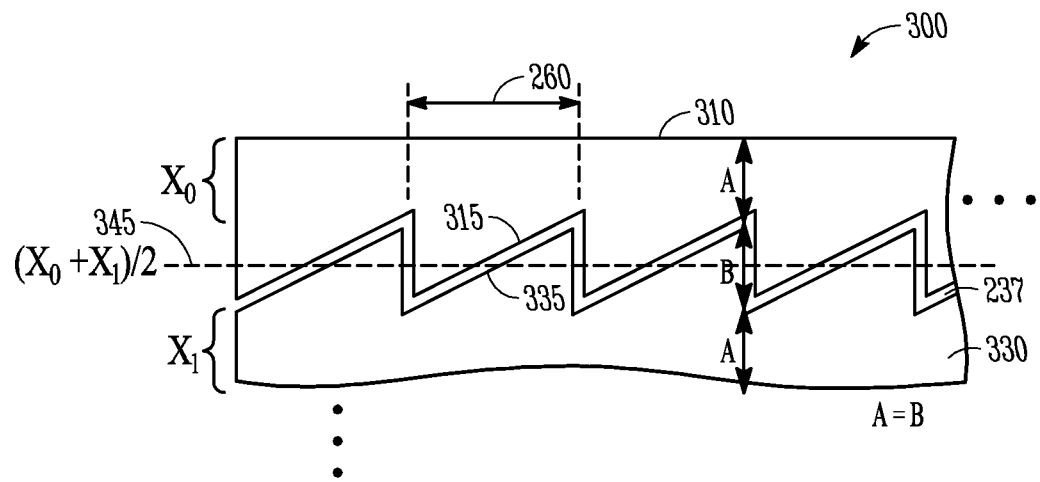
FIG. 3 illustrates an interdigitated drive electrode pattern with triangular interpolation for a touchscreen according to an example embodiment.

FIG. 3 illustrates an interdigitated drive electrode pattern 300 with triangularly interpolated regions for a touchscreen according to an example embodiment. Pattern 300 includes a drive electrode 310 running in a first direction. Drive electrode 310 is driven by a drive line $X_0$, (not shown) and includes triangular projections indicated at 315. An adjacent electrode 330 includes triangular projections indicated at 335 that are interdigitated with triangular projections 315, and are separated by a gap 237. The area of interdigitation of drive electrodes 310 and 330 provide an interpolated or intermediate drive section as represented by broken line 345 and the description of the signal at the interpolated drive section: $(X_0+X_1)/2$ signifying that the interpolated drive section is effectively driven with one half the signal from each of the adjacent drive lines when such drive electrodes are driven.

Layout 300 provides a near one to one relationship between drive sections and interpolated drive sections. In one embodiment, the drive sections and interpolated drive sections run in the first direction, and are substantially the same width. The gap 237 in one embodiment, is narrow enough to provide substantial coverage by the conductive material of the electrodes, but wide enough to provide consistent electrical isolation between the adjacent electrodes. In some embodiments, an electrode layout may contain more than one interdigitated electrode shape, such as a combination of stepped, triangular, saw toothed, or other shapes having one or more sloped sides.

Figure 4:
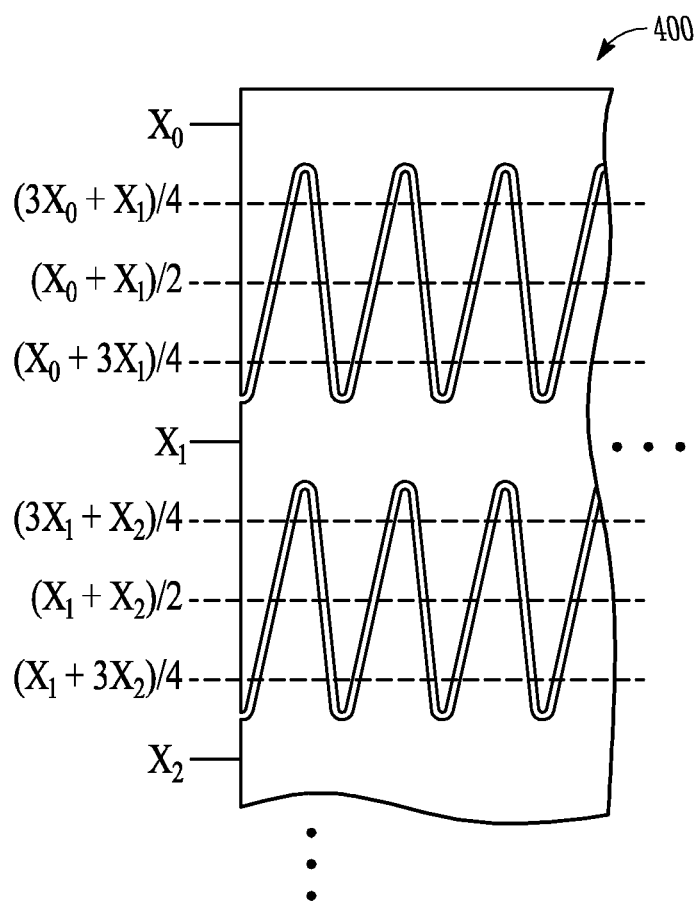
FIG. 4 illustrates a triangular pattern of interdigitated drive electrodes having an elongated cross-section with multiple interpolative zones, according to an example embodiment.

FIG. 4 is an illustration of an alternative interdigitated drive electrode layout 400. In one embodiment, the drive electrodes are formed with interdigitated triangular areas of the drive electrodes to create interpolated drive sections. The triangular areas may be used to create a near one to one relationship between drive sections and interpolated drive sections. In further embodiments, the triangular projections may extend farther than the width of a single drive section, such that two or more interpolated drive sections may be obtained between each driven section. The triangular portions in one embodiment may extend an integer number of widths of a drive section to provide the same integer number of interpolated drive sections between each drive section. As one possible example, FIG. 4 shows three latitudinal lines of interpolation which may be employed to 'stretch' the electrode spacing between the primary drive sections. The mixture of fields from the primary drive sections is shown in the 6 equations of the drawing.

Figure 5:
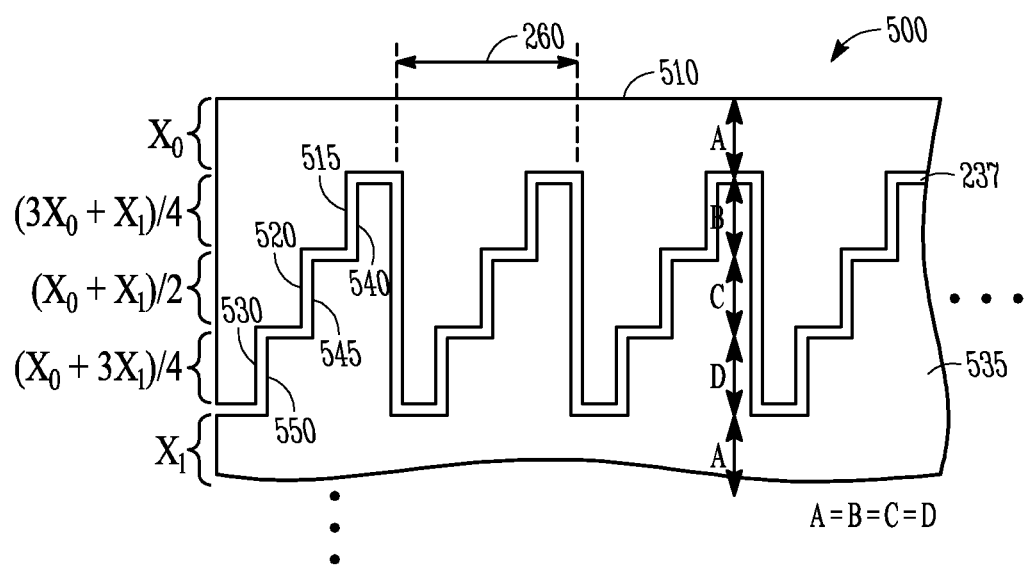
FIG. 5 illustrates an interdigitated drive electrode pattern with multiple stepped interpolative zones for a touchscreen according to an example embodiment.

FIG. 5 is an illustration of an interdigitated drive electrode pattern 500 with multiple stepped interpolation for a touchscreen according to an example embodiment. Pattern 500 includes a drive electrode 510 running in a first direction. Drive electrode 510 is driven by a drive line $X_0$, not shown, and includes multiple stepped projections indicated at 515, 520, and 530. An adjacent electrode 535 includes multiple stepped projections indicated at 540, 545, and 550 that are interdigitated with the stepped projections of the first drive electrode 510. The non-interdigitated electrode sections or zones labeled $X_0$ and $X_1$ provide primary field emission, while the interdigitated sections labeled $(3X_0+X_1)/4$, $(X_0+X_1)/2$, and $(X_0+3X_1)/4$ provide three intermediate field mixtures in order to provide interpolation between zones $X_0$ and $X_1$, according to the ratio of surface areas of $X_0$ and $X_1$ in these respective zones. In this example, the touch panel can be driven by approximately ¼ the number of drive lines that would otherwise be required without the use of interdigitation. Pattern 500 provides an almost one to three relationship between drive sections and interpolated drive sections. In one embodiment, the drive sections and interpolated drive sections run in the first direction, and are substantially the same width. The distance between the projections in one embodiment, is small enough to provide substantial coverage by the conductive material of the electrodes, and large enough to provide consistent electrical isolation between the adjacent electrodes.

Figure 6:
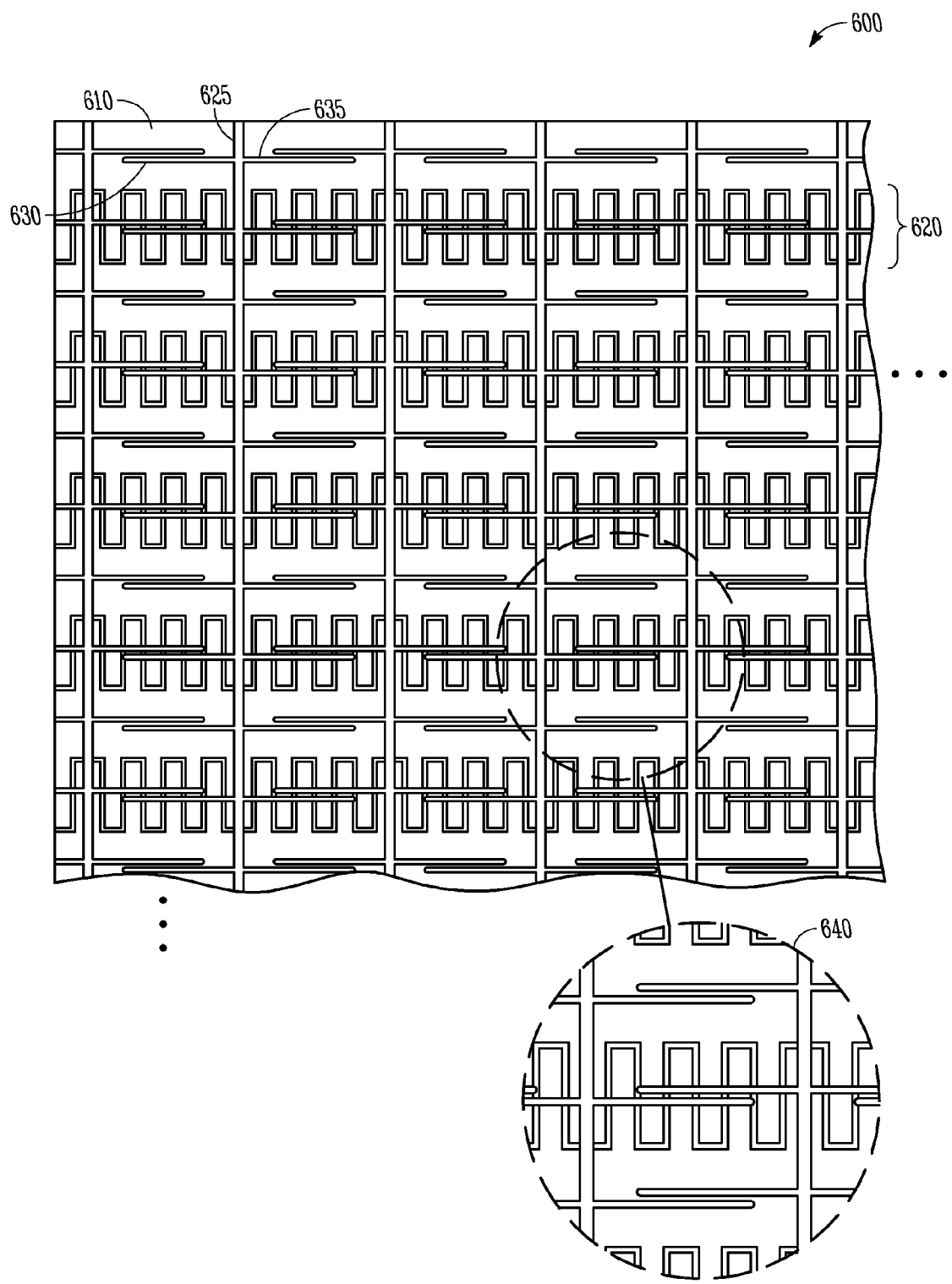
FIG. 6 illustrates an interdigitated drive electrode pattern on one layer and sense electrodes with crossbars on a second layer according to an example embodiment.

FIG. 6 is an example 2-layer electrode pattern 600. In one embodiment, drive electrodes are on an underlying layer and receive electrodes are on an upper layer as shown. The drive electrodes may be formed over a display, such as an LED (light emitting diode), LCD (liquid crystal display), OLED (organic LED), CRT (cathode ray tope), or other type of display device. One drive electrode is identified at 610. Between each set of adjacent drive sections are interdigitated drive sections, referred to as interpolated drive sections. One such interdigitated section is indicated at 620. It is driven by the corresponding drive lines of adjacent drive sections.

Also visible in FIG. 6 are a plurality of sense electrodes, also referred to as Y electrodes. The Y electrodes in one embodiment are separated from the X drive electrodes by a dielectric layer and run generally in a second direction. An example Y electrode includes a spine as indicated at 625 having crossbars extending from both sides of the spine at 630 and 635. The spines 625 generally run transverse to the drive electrodes, crossing both drive sections and interpolated drive sections. The crossbars generally extend from the spines 625 in the same direction as the drive electrodes. In one embodiment, the crossbars of adjacent spines overlap for about 50% of the distance between the spines. Thus, each crossbar extends about 75% of the distance between spines. Additional sense electrodes and drive electrodes may be included in layout 600 as indicated by the dots. In further embodiments, the spines do not have crossbars.

FIG. 6 also includes a blown up portion of the electrode layout at 640. The blown up portion shows that the drive electrodes are separated from each other by a gap such that they are not in direct electrical contact with each other. Further, the crossbars are also separated by a gap.

Figure 7:
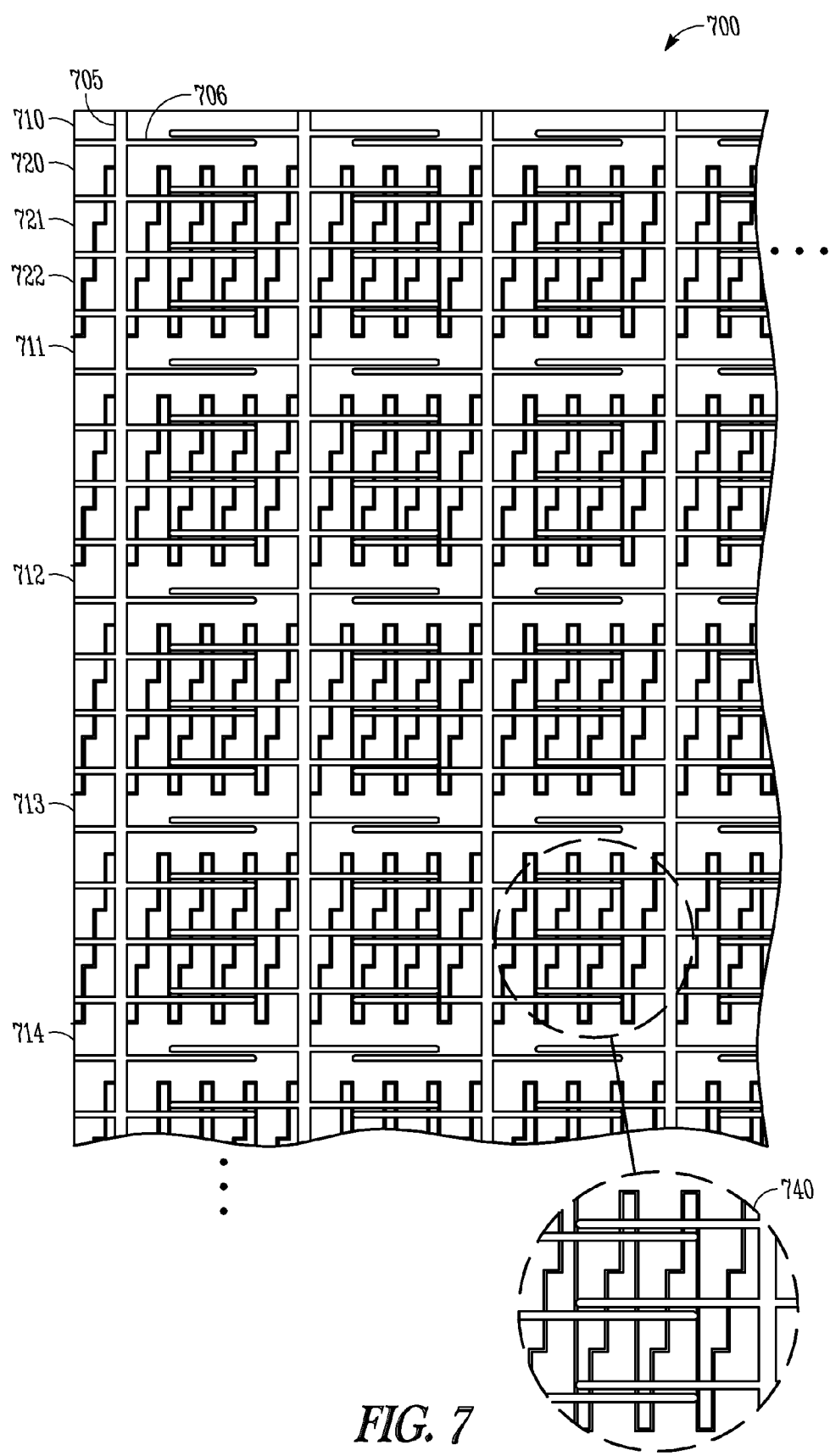
FIG. 7 illustrates an interdigitated drive electrode pattern on one layer with multiple stepped interpolation, and sense electrodes with crossbars on a second layer, according to an example embodiment.

FIG. 7 is an illustration of an interdigitated drive electrode layout 700 with multiple stepped interpolation, and sense electrodes 705 with crossbars 706. In one embodiment, drive electrodes 710, 711, 712, 713, and 714 are illustrated. Additional sense electrodes and drive electrodes may be included in layout 700 as indicated by the dots. Note that the reference numbers are meant to identify the drive electrodes, not the crossbars of corresponding sense electrodes. The drive electrodes may be driven by corresponding drive lines. Three interpolated drive sections may be formed between the drive sections using three steps to provide an interdigitated area such as indicated at 720, 721, and 722. Layout 700 thus provides many interpolated drive sections with only a few drive lines.

FIG. 7 also includes a blown up portion of the electrode layout at 740. The blown up portion shows that the drive electrodes are separated from each other by a gap such that they are not in direct electrical contact with each other. Further, the crossbars are also separated by a gap.

Figure 8:
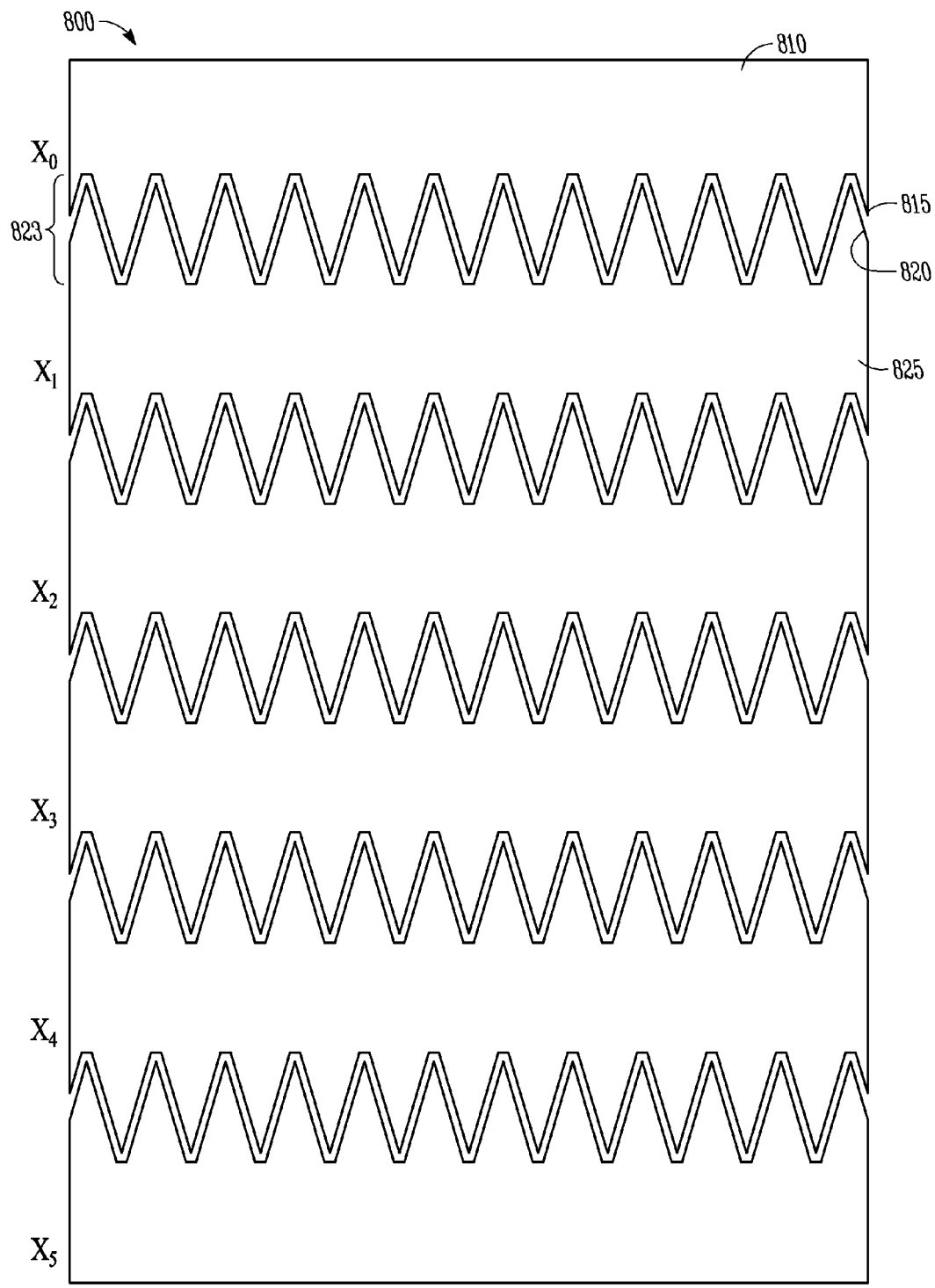
FIG. 8 illustrates an alternative interdigitated drive electrode pattern with interpolation for a touchscreen according to an example embodiment.

FIG. 8 illustrates an alternative interdigitated drive electrode layout 800 with interpolated sections for a touchscreen according to an example embodiment. In this embodiment, filled drive electrodes, such as drive electrode 810 has repeating saw tooth projections 815 that interdigitate with corresponding saw tooth projections 820 of an adjacent drive electrode 825. The interdigitated saw tooth projections 815 and 820 form an interpolated section 823 that is effectively driven via drive electrodes 810 and 825. In one embodiment, the saw tooth projections are in the shape of an isosceles triangle. Further triangular shapes may be used in further embodiments, to obtain an interpolated section that includes electrode projections equally from each drive electrode. A near one to one correspondence between drive sections and interpolated sections is obtained in this manner. In further embodiments, the triangular projections may extend longer than the width of a single drive electrode, such that two or more interpolated sections may be obtained between each driven electrode.

Figure 9:
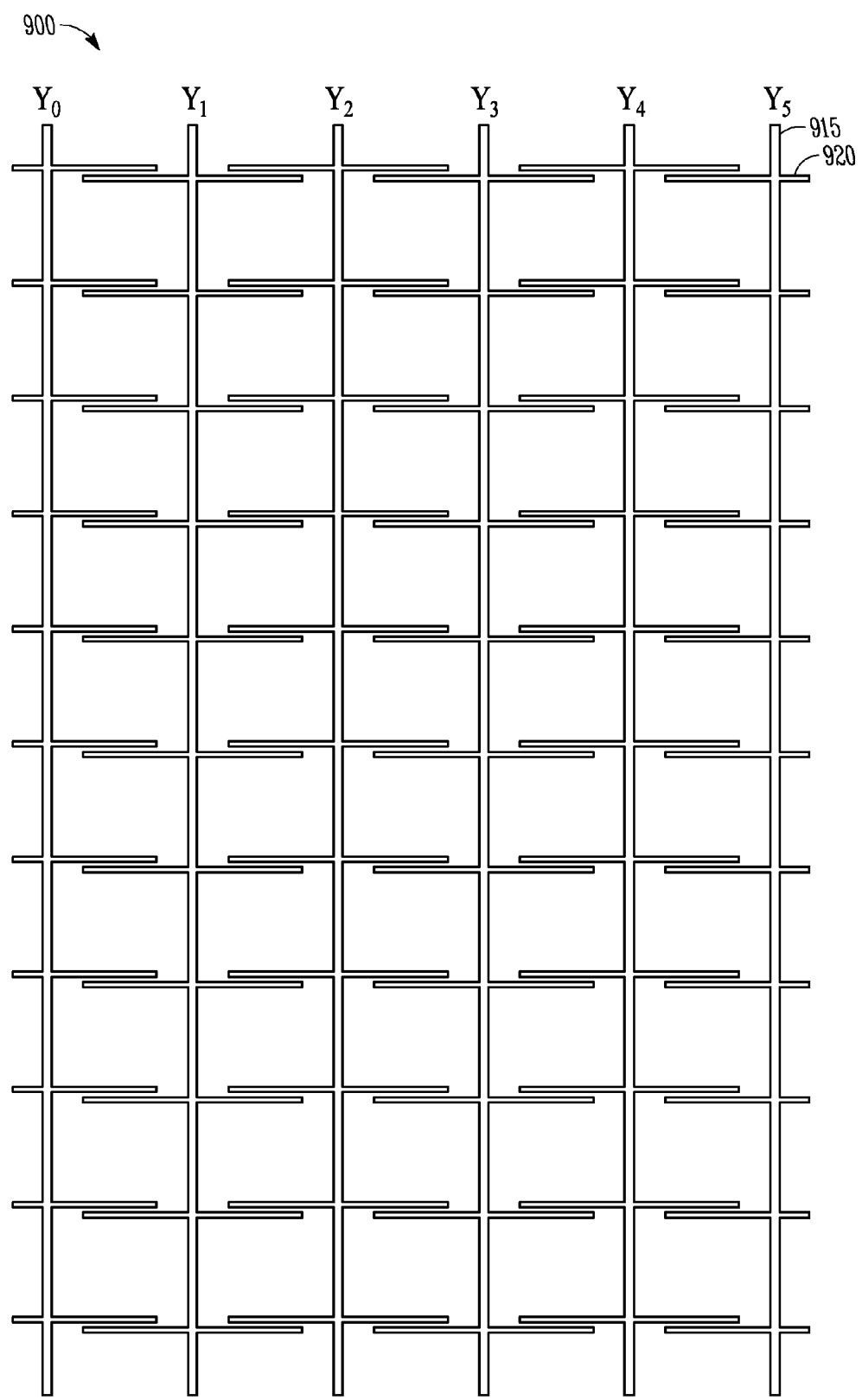
FIG. 9 illustrates a receive electrode pattern for the alternative interdigitated drive electrode pattern of FIG. 8.

FIG. 9 illustrates a receive electrode pattern 900 for the alternative interdigitated drive electrode pattern of FIG. 8. Several receive electrodes labeled $Y_0$-$Y_5$ are illustrated and have spines 915 and crossbars 920 in one embodiment.

Figure 10:
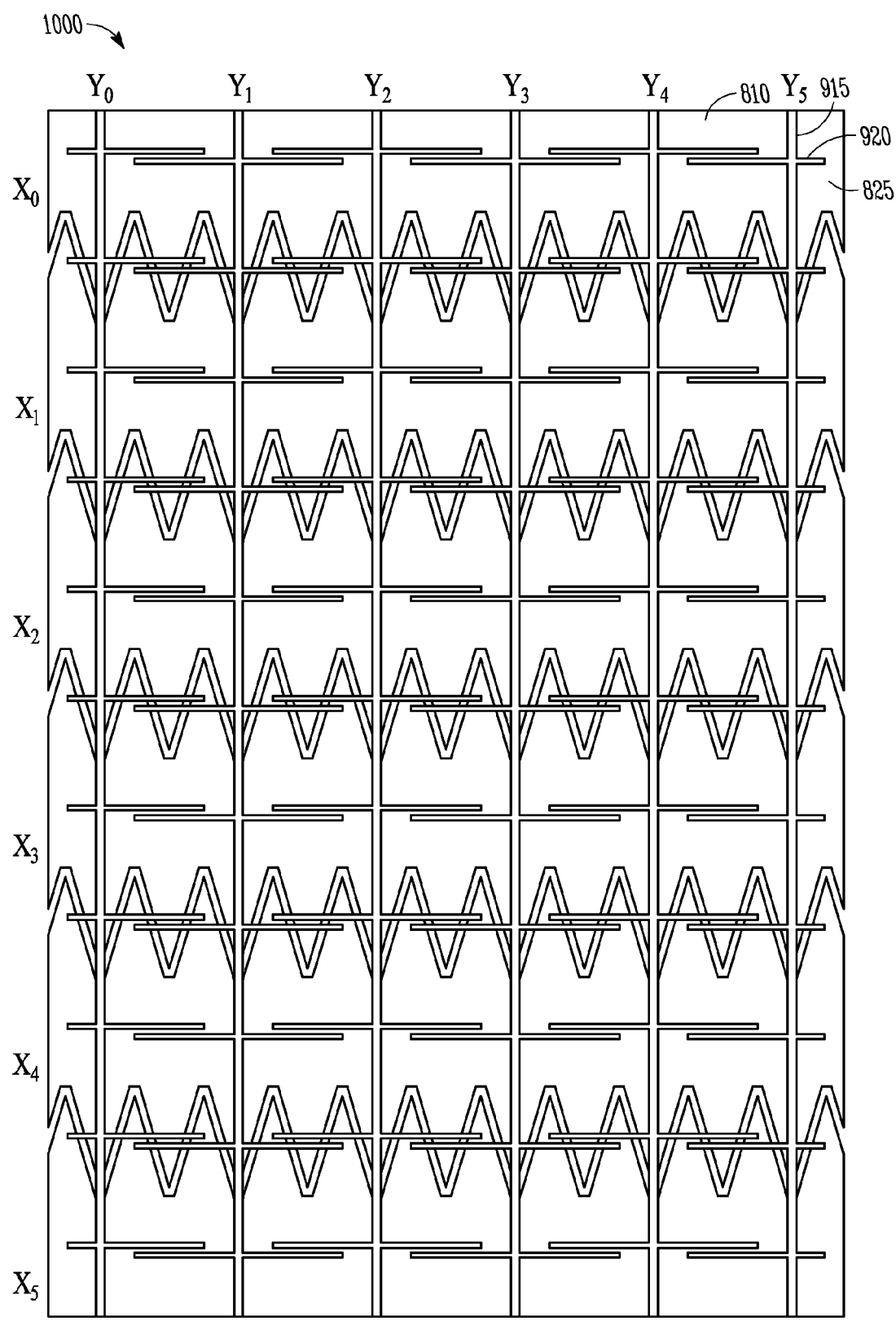
FIG. 10 illustrates the alternative interdigitated drive electrode pattern with interpolation along with sense electrodes for a touchscreen according to an example embodiment.

FIG. 10 illustrates the electrode pattern of FIG. 8 with interpolation, along with sense electrodes generally at 1000. In addition to the drive electrodes with interdigitated triangular projections to form interpolated drive electrodes between drive electrodes, receive electrodes $Y_0$-$Y_5$ having spines 915 and crossbars 920 are aligned with the drive electrodes in two separate layers and are separated by a dielectric. The crossbars 920, one of which is identified by a reference number, align with and run in the same general direction as both the drive electrode and interpolated drive electrodes.

In the embodiment shown, six drive electrodes $X_0$-$X_5$ and six sense electrodes $Y_0$-$Y_5$ may be coupled to a controller (not shown). An additional five interpolated drive electrode sections may be derived from the interdigitation of the projections of the drive electrodes. In one embodiment, each intersection of the Y electrode spines with the drive electrodes and interpolated drive electrode sections forms a node from which touch information may be derived. The crossbars of the spines as well as the interpolated drive electrode sections both contribute to sensing touch, facilitating an interpolation of signals via adjacent nodes.

Figure 11:
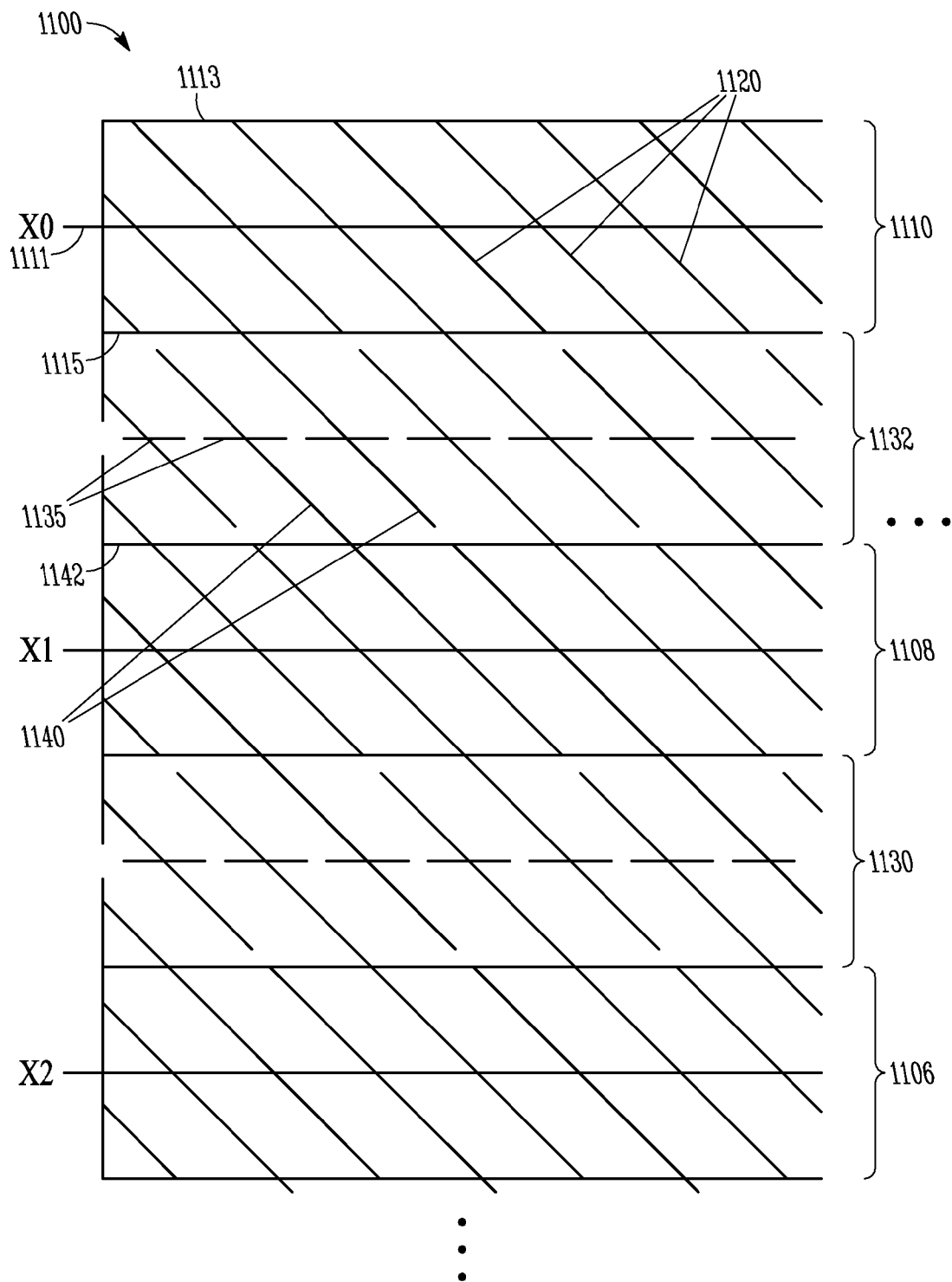
FIG. 11 illustrates a portion of an interdigitated fine line drive electrode pattern with interpolation for a touchscreen according to an example embodiment.

FIG. 11 is an illustration of an alternative drive electrode layout 1100 for a portion of a touchscreen having interpolated fine line drive electrodes, for example made of metal using line widths narrow enough and sparse enough so as not to be easily visible when placed over a display screen. In one embodiment, layout 1100 has primary boxed-in drive sections indicated at 1106, 1108 and 1110. Drive section 1110 includes a primary drive line 1111 running through the center of the boxed-in drive section, and adjacent box lines 1113 and 1115, along with a plurality of intersecting cross lines 1120, three of which are identified by reference number. In one embodiment, the lines bounded by box lines 1113 and 1115 are all electrically coupled to each other, forming a box like drive electrode whose length spans one dimension of the touch panel and whose width spans a dimension similar to that of a solid electrode shape such as shown as $X_0$ in FIG. 2. The box geometry shown in section 1110 provides for multiple electrical pathways which act to improve manufacturing yields which could otherwise be negatively impacted due to breaks or fractures in the fine lines caused by process imperfections and material handling. The three longitudinal pathways formed by 1115, 1111, and 1113 act to shunt current flow around single-point or even two-point failures in most cases, thereby preventing small defects from causing dead regions in the touch panel's response.

The fine lines in one embodiment of FIG. 11 have a width of 10 um or less, along with an average density of 5% or less over the display area. The density may be higher or lower in further embodiments. The line widths and density may be selected such that a display beneath the electrodes remains substantially visible to a user of the touchscreen without observable optical interference. In one embodiment, the cross lines 1120 may be at a diagonal from the lines 1111, 1113 and 1115 to reduce optical moiré effects. In a further embodiment, the spine and box lines 1111, 1113 and 1115 may also be formed of curves or zig-zag line segments to further reduce optical interference with the display pixels under the electrode array. All comments related to section 1110 as noted above apply equally to other similar sections for example 1106 and 1108.

Interpolated sections 1130, 1132 reside between the primary drive sections 1106, 1108 and 1110. These interpolated sections include box line replicators as indicated at 1135 and cross lines 1140 that alternately couple to box lines 1115 and a box line 1142 of neighboring primary drive section 1108. Only two of the box line replicators 1135 and cross lines 1140 are identified by reference number. The purpose of the box line replicators is two-fold: firstly, to visually match the interpolated sections such as 1132 with the driven sections such as 1110 so that there density of fine lines is maintained on a sectional basis, and secondly, to match the capacitive field emission with the fields found along the spine of the primary driven sections for example from line 1111. Without the box line replicator line segments, there could appear to the eye a stripes of varying light transmission from the underlying display due to a substantial change in regional line density, and, the capacitive interpolation in the interpolative sections such as 1132 would be unduly weaker, causing signal dropout and/or localized nonlinearity of touch response. Clearly, more or fewer longitudinal conductors than shown could be used for each primary-driven section without changing the functionality of the section. The connection of cross lines within the interpolated sections to alternate adjacent primary drive sections provide an effect of driving each of the interpolated sections with one-half the signal of each primary drive section, providing for interpolation between the primary drive sections in a manner similar to the previously described interdigitated electrode patterns such as section $(X_0+X_1)/2$ shown in conjunction with FIG. 2.

Figure 12A:
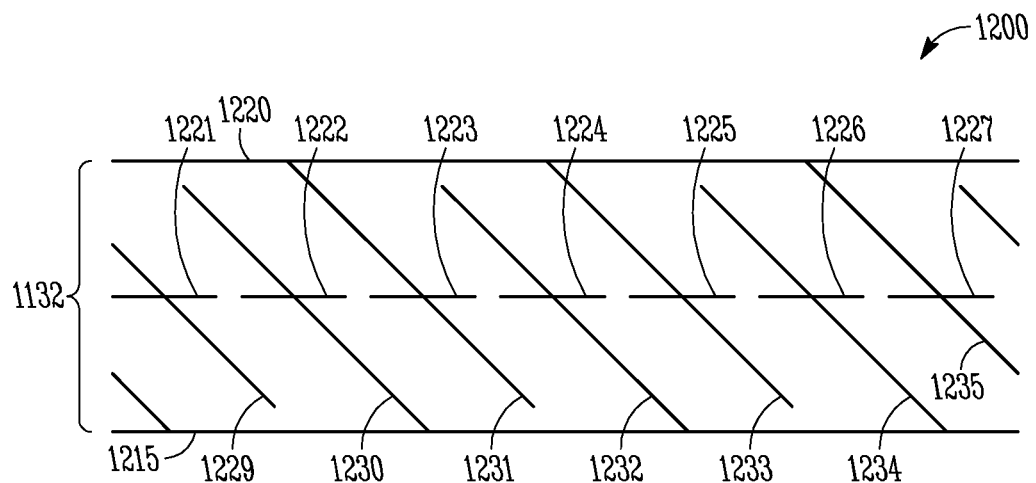
FIG. 12A illustrates an interpolated drive region of the pattern of FIG. 11 according to an example embodiment.

FIG. 12A illustrates a portion 1200 of the interpolated drive section 1132 between two box lines 1215 and 1220 of neighboring primary drive sections. Interpolated drive section 1210 is bisected by box line replicators 1221, 1222, 1223, 1224, 1225, 1226, and 1227 that run substantially parallel to box lines 1215 and 1220 in one embodiment. Each box line replicator has one or more cross lines as indicated at 1229, 1230, 1231, 1232, 1233, 1234 and 1235 respectively. In one embodiment, the cross lines run at a diagonal from the passive box lines and alternately connect to one of the box lines 1215 and 1220. As shown, box line replicator 1226 has a cross line 1234 that extends to couple with box line 1215, and also extends toward box line 1220, but does not contact it. In one embodiment, alternating cross lines 1230, 1232 and 1234 contact box line 1215, but not box line 1220. Similarly alternating cross lines 1231, and 1233 contact box line 1220, but not box line 1215. In further embodiments, the cross lines may run orthogonal to the box line replicators instead of diagonally. The passive box line replicators 1221 are physically and electrically isolated from each other in one embodiment, and the cross lines alternately connect to different adjacent box lines forming an interdigitated electrode structure corresponding to the interpolated drive section 1210, similar in nature and intent to the interpolated region $(X_0+X_1)/2$ of FIG. 2. In this embodiment, an almost one to one correspondence between drive sections and interpolated drive sections is provided (there are N−1 interpolated regions for N electrodes). The sections may also be referred to as drive sections, zones, or regions, and interpolated drive sections, zones, or regions.

Figure 12B:
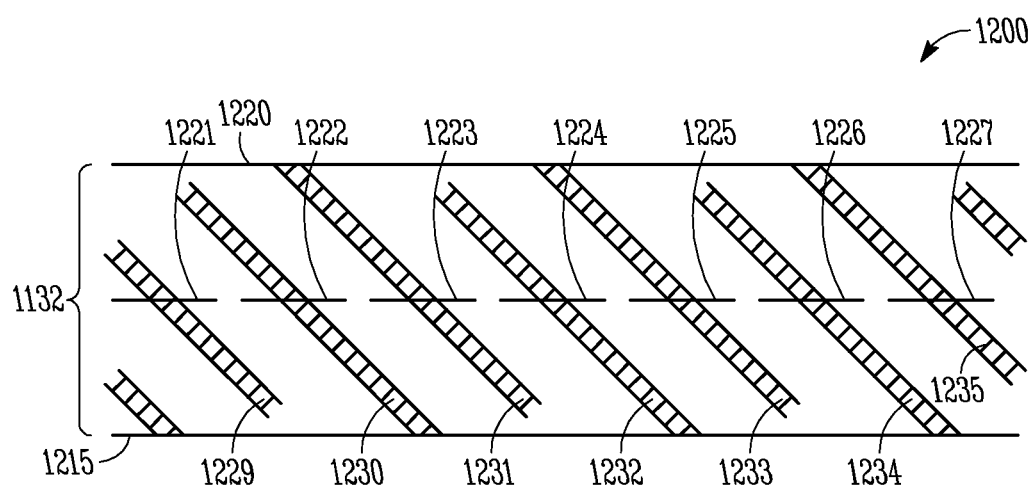
FIG. 12B illustrates an alternative interpolated drive region of the pattern of FIG. 11 according to an example embodiment.

FIG. 12B illustrates an alternative portion 1200 of the interpolated drive section 1132 between two box lines 1215 and 1220 of neighboring primary drive sections. The cross lines 1229, 1230, 1231, 1232, 1233, 1234, and 1235 are formed in a ladder shape, having two lines connected at various intervals by rungs. The ladder shape provides redundant conductive pathways in the event of small discontinuities which might otherwise create dead spots in the sections. In further embodiments, box line replicators and box lines may also have similar structures.

Figure 13:
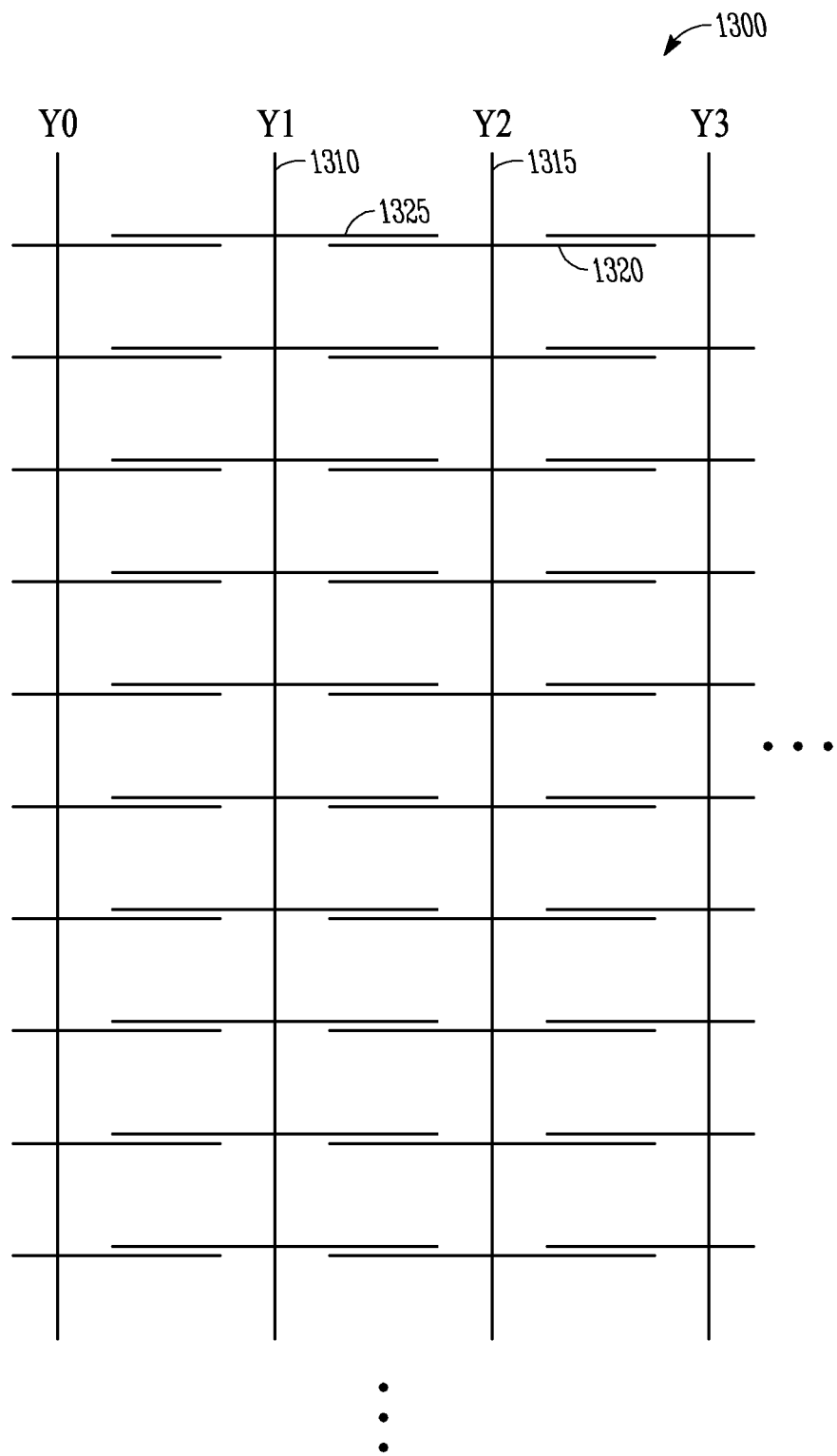
FIG. 13 illustrates a sense electrode pattern according to an example embodiment.
Figure 14:
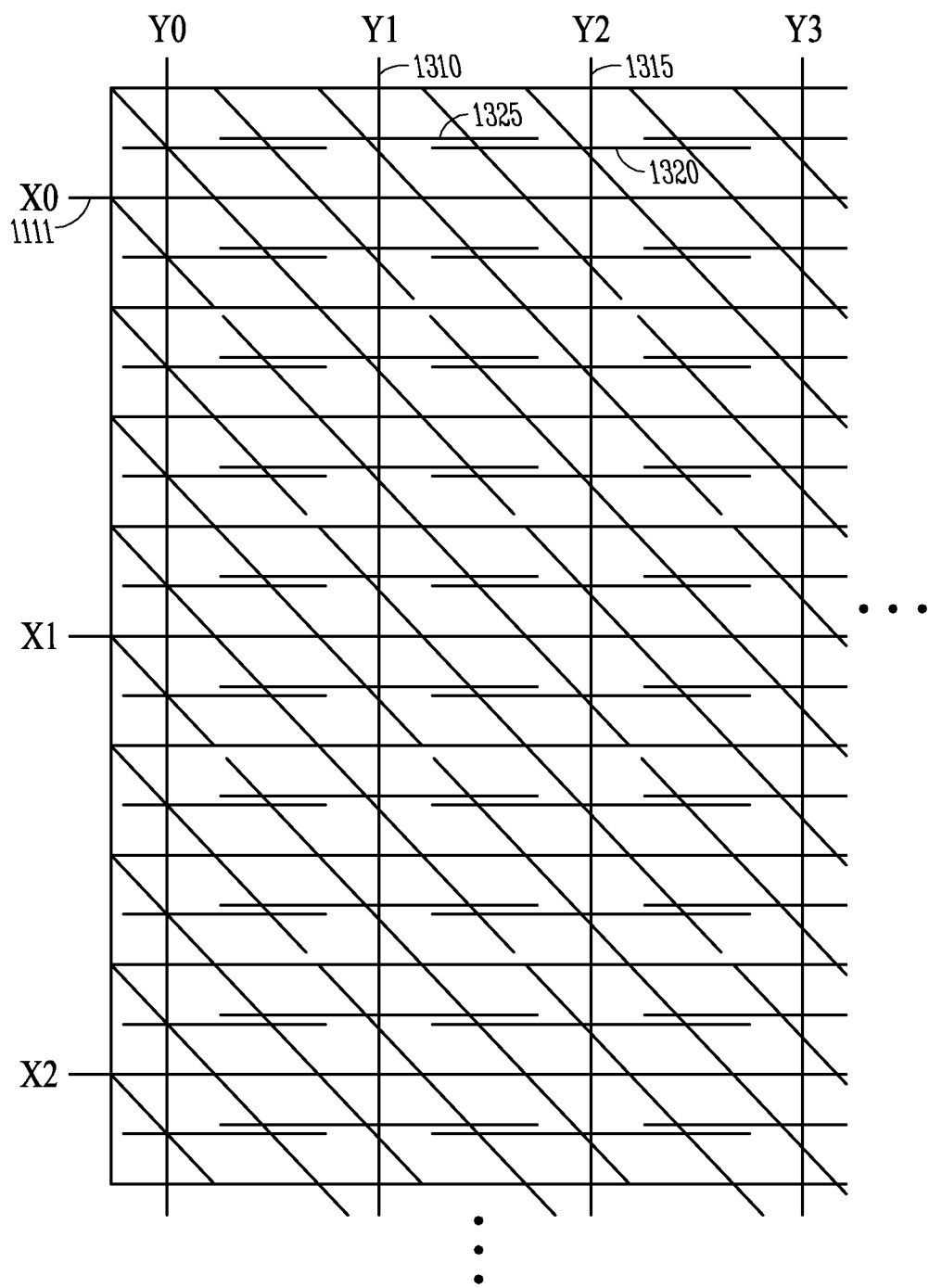
FIG. 14 illustrates a fine line drive electrode pattern with interpolation including sense electrodes for a touchscreen according to an example embodiment.

FIG. 13 is an illustration of an example 'Y' sense electrode pattern 1300, which is a fine-line analog to the Y electrode structure shown in FIG. 6. The sense electrode layout is formed of fine conductive lines in one embodiment, and includes a spine, two of which are identified at 1310 and 1315 which will generally run transverse to X electrodes in a finished touchscreen device. The number of spines required depends on the size of the touch panel and the required touch resolution; more spines per unit distance will lead to more resolution in the axis perpendicular to the axis of the Y spines. Each spine has a plurality of intersecting crossbars such as referenced at 1320. In the embodiment shown, a spine has two crossbars corresponding to each primary drive section and each interpolated drive section, as shown in FIG. 14. The crossbars of adjacent spines may overlap a desired amount between the spines. In one embodiment, the crossbars 1320 and 1325 overlap, but are not directly electrically coupled to each other, for approximately 50% of the distance between the adjacent spines 1310 and 1315. A set of contacts may be provided for coupling the sense electrodes to control electronics (not shown).

FIG. 14 is an illustration of an electrode layout for a touchscreen device showing blocks corresponding to fine line 'X' drive electrodes and 'Y' sense electrodes. Primary drive sections are indicated at $X_0, X_1, X_2, \ldots$.

Sense electrodes with crossbars are indicated at $Y_0, Y_1, Y_2, Y_3, \ldots$. The crossbars correspond to each of the primary drive sections and interpolated sections. Both the primary drive sections and the sense electrodes may be coupled via drive and sense lines to control circuitry (not shown).

Control circuitry may include a microcontroller and various other circuitry for driving drive electrodes, detecting signals responsive to touch at nodes formed by intersections of drive electrodes and sense electrodes where such electrodes overlap, and interpolating detected signals to identify one or more locations on the touchscreen being touched. In one embodiment, the control circuitry may be a microcontroller, which may be programmed to control driving and sensing by combinations of firmware, hardware and software in various embodiments.

Figure 15:
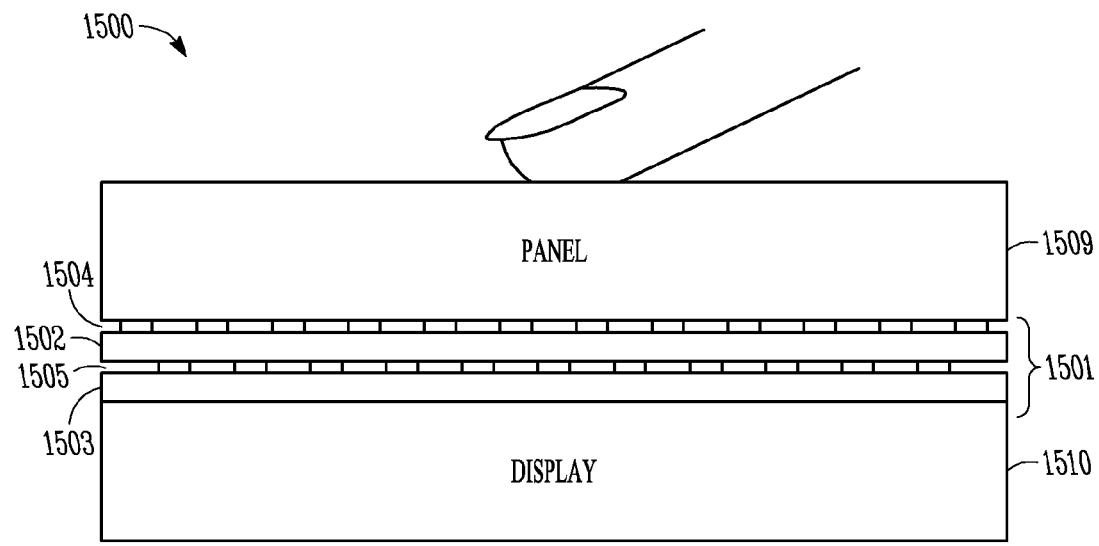
FIG. 15 illustrates a touch sensitive device overlaying a display panel, according to an example embodiment.

FIG. 15 is a cross section representation of a touch sensitive device 1500 that may incorporate various embodiments of the electrode layouts described. An assembly stack 1501, in one embodiment utilizes two support layers, 1502 and 1503, with respective electrodes 1504 and 1505 supported on the respective support layers. Adhesive layers may be used to secure the layers of the assembly stack 1501. The assembly stack may be sandwiched between a touch panel 1509 and a display 1510 to form the touch sensitive device 1500. In various embodiments, the display 1510 may be an LCD display. The touch sensitive device 1500 may be a touchscreen display device in some embodiments.

Figure 16:
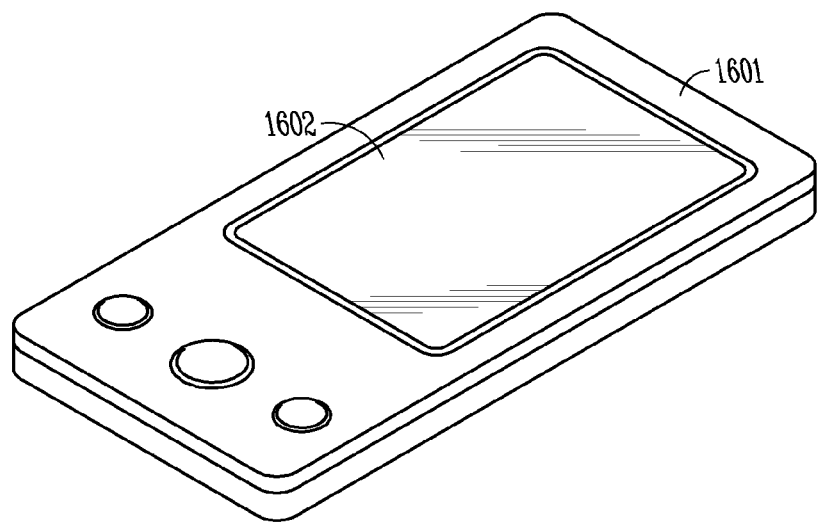
FIG. 16 illustrates a cellular telephone having a touchscreen display, consistent with an example embodiment of the invention

Touch sensitive devices such as touchscreen displays may be used in a variety of applications, from automatic teller machines (ATM machines), home appliances, personal digital assistants and cell phones, and other such devices. One example cellular telephone and PDA device is illustrated in FIG. 16. A cellular telephone device 1601 includes a touchscreen display 1602 comprising a significant portion of the largest surface of the device. The large size of the touchscreen enables the touchscreen to present a wide variety of data, including a keyboard, a numeric keypad, program or application icons, and various other interfaces as desired.

The user may interact with the device by touching with a single finger, such as to select a program for execution or to type a letter on a keyboard displayed on the touchscreen display assembly 1602, or may use multiple touches such as to zoom in or zoom out when viewing a document or image. In other devices, such as home appliances, the display may not change or may change only slightly during device operation, and may recognize only single touches.

The invention claimed is:

1. A device comprising:
a plurality of drive electrodes for a touch sensitive device, the drive electrodes running generally in a first direction, wherein adjacent ones of the plurality of drive electrodes are interdigitated with one another to provide one or more interpolated sections of the drive electrodes, a first one of the plurality of drive electrodes comprising a plurality of lines forming multiple electrical pathways, the plurality of lines comprising at least one primary drive line running generally in the first direction, at least two box lines running generally in the first direction, and a plurality of cross lines, each cross line coupled to at least one box line of the first drive electrode and running at a diagonal from the box lines such that the multiple electrical pathways are arranged to shunt a current flow around a point on a line of the plurality of lines forming multiple electrical pathways, wherein at least one of the one or more interpolated sections of the drive electrodes comprises interdigitated cross lines that are alternately connected to a first box line of the first one of the plurality of drive electrodes and a second box line of a second drive electrode, the second drive electrode located adjacent to the first drive electrode; and
a plurality of sense electrodes separated from the plurality of drive electrodes by a dielectric layer.

2. The device of claim 1 wherein adjacent ones of the plurality of drive electrodes are interdigitated with one another in a stepped manner to provide an interpolated section between each pair of adjacent drive electrodes.

3. The device of claim 1 wherein adjacent ones of the plurality of drive electrodes are interdigitated with one another in a sloped manner.

4. The device of claim 1 wherein the plurality of lines forming multiple electrical pathways are formed of metal lines that are thin enough to not be easily visually perceptible.

5. The device of claim 1 wherein the cross lines coupled to the box lines run diagonally from the box lines such that a moire effect is reduced.

6. The device of claim 1 wherein a cross line is formed of redundant conductive metal lines coupled to each other in multiple places.

7. The device of claim 1, wherein the at least one of the one or more interpolated sections comprises at least one passive box line replicator, the at least one passive box line replicator comprising a plurality of line segments aligned generally in the first direction to visually match the at least one of the one or more interpolated sections with a drive section of the plurality of drive electrodes, the drive section comprising the primary drive line and the at least two box lines of the first drive electrode.

8. The device of claim 1, wherein the plurality of lines forming multiple electrical pathways are formed of metal lines having a width of less than 10 um and an average density of 5% or less over a display area.

9. A sensing device comprising:
a drive electrode layer comprising a plurality of drive electrodes, the drive electrodes running generally in a first direction, wherein adjacent ones of the plurality of drive electrodes are interdigitated with one another such that the drive electrode layer has drive sections and interpolated sections, a first one of the plurality of drive electrodes comprising a plurality of lines forming multiple electrical pathways, the plurality of lines comprising at least one primary drive line running generally in the first direction, at least two box lines running generally in the first direction and a plurality of cross lines, each cross line coupled to at least one box line of the first drive electrode and running at a diagonal from the box lines such that the multiple electrical pathways are arranged to shunt a current flow around a point on a line of the plurality of lines forming multiple electrical pathways, wherein at least one of the interpolated sections of the drive electrodes comprises interdigitated cross lines that are alternately connected to a first box line of the first one of the plurality of drive electrodes and a second box line of a second drive electrode, the second drive electrode located adjacent to the first drive electrode;
a dielectric layer; and
a sense electrode layer separated from the drive electrode layer by the dielectric layer and having a plurality of spines running in a second direction substantially transverse to the first direction and a plurality of crossbars coupled to the spine and running generally in the first direction, wherein the crossbars are arranged along the length of the spine.

10. The device of claim 9 wherein the crossbars have a one to one correspondence with the primary drive sections and interpolated sections of the drive electrodes.

11. The device of claim 10 wherein the crossbars extend approximately seventy five percent of the distance toward adjacent spines such that crossbars from adjacent spines overlap one half the distance between spines.

12. The device of claim 9 wherein adjacent ones of the plurality of drive electrodes are interdigitated with one another in a stepped manner.

13. The device of claim 9 wherein the plurality of lines forming multiple electrical pathways are formed of thin metal lines.

14. The device of claim 9, wherein the at least one of the interpolated sections comprises at least one passive box line replicator, the at least one passive box line replicator comprising a plurality of line segments aligned generally in the first direction to visually match the at least one of the interpolated sections with a first drive section of the plurality of drive electrodes, the driven section comprising the primary drive line and the at least two box lines of the first drive electrode.

15. The device of claim 9, wherein the plurality of lines forming multiple electrical pathways are formed of metal lines having a width of less than 10 um and an average density of 5% or less over a display area.

16. A sensing device comprising:
a drive electrode layer comprising a plurality of drive electrodes, the drive electrodes running generally in a first direction, wherein adjacent ones of the plurality of drive electrodes are interdigitated with one another such that the drive electrode layer has drive sections and interpolated sections, a first one of the plurality of drive electrodes comprising a plurality of lines forming multiple electrical pathways, the plurality of lines comprising at least one primary drive line running generally in the first direction, at least two box lines running generally in the first direction, and a plurality of cross lines, each cross line coupled to at least one box line and running at a diagonal from the box lines such that the multiple electrical pathways are arranged to shunt a current flow around a point on a line of the plurality of lines forming multiple electrical pathways, wherein at least one of the interpolated sections comprises interdigitated cross lines that are alternately connected to a first box line of the first one of the plurality of drive electrodes and a second box line of a second drive electrode, the second drive electrode located adjacent to the first drive electrode;

a dielectric layer;

a sense electrode layer separated from the drive electrode layer by the dielectric layer and having a plurality of spines running in a second direction substantially transverse to the first direction; and a display layer beneath the drive electrode layer, wherein the display layer is visible through the sense electrode layer, the dielectric layer and the drive electrode layer.

17. The sensing device of claim 16 wherein the sense electrode layer further comprises a plurality of crossbars coupled to each spine and running generally in the first direction.

18. The device of claim 17 wherein the crossbars have a one to one correspondence with the drive sections and interpolated sections of the drive electrodes.

19. The device of claim 18 wherein the crossbars extend approximately seventy five percent of the distance toward adjacent spines such that crossbars from adjacent spines overlap about one half the distance between spines.

20. The device of claim 16 wherein adjacent ones of the plurality of drive electrodes are interdigitated with one another in a stepped manner.

21. The device of claim 16 wherein the plurality of lines forming multiple electrical pathways are formed of thin metal lines.

22. The method of claim 21, wherein the at least one interpolation of the drive electrodes comprises at least one passive box line replicator, the at least one passive box line replicator comprising a plurality of line segments aligned generally in the first direction to visually match the at least one interpolation of the drive electrodes with a drive section of the plurality of drive electrodes, the drive section comprising the primary drive line and the at least two box lines of the first drive electrode.

23. The device of claim 16, wherein the plurality of lines forming multiple electrical pathways are formed of metal lines having a width of less than 10 um and an average density of 5% or less over a display area.

24. A method comprising:

forming a plurality of drive electrodes on a substrate, the drive electrodes running generally in a first direction, wherein adjacent ones of the plurality of drive electrodes are interdigitated with one another to provide at least one interpolation of the drive electrodes, a first one of the plurality of drive electrodes comprising a plurality of lines forming multiple electrical pathways, the plurality of lines comprising at least one primary drive line running generally in the first direction, at least two box lines running generally in the first direction, and a plurality of cross lines, each cross line coupled to at least one box line and running at a diagonal from the box lines such that the multiple electrical pathways are arranged to shunt a current flow around a point on a line of the plurality of lines forming multiple electrical pathways, wherein the at least one interpolation of the drive electrodes comprises interdigitated cross lines that are alternately connected to a first box line of the first one of the plurality of drive electrodes and a second box line of a second drive electrode, the second drive electrode located adjacent to the first drive electrode; and forming a plurality of sense electrodes separated from the plurality of drive electrodes by a dielectric layer.

25. The method of claim 24, wherein the plurality of lines forming multiple electrical pathways are formed of metal lines having a width of less than 10 um and an average density of 5% or less over a display area.

* * * * *